(12) United States Patent
Roberge

(10) Patent No.: US 9,291,123 B2
(45) Date of Patent: Mar. 22, 2016

(54) GAS TURBINE ENGINE EXHAUST DUCT

(75) Inventor: Gary D. Roberge, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 902 days.

(21) Appl. No.: 13/558,484

(22) Filed: Jul. 26, 2012

(65) Prior Publication Data

US 2014/0030074 A1  Jan. 30, 2014

(51) Int. Cl.
*F02K 1/82* (2006.01)

(52) U.S. Cl.
CPC .............. *F02K 1/822* (2013.01); *F05D 2230/90* (2013.01); *F05D 2250/231* (2013.01); *F05D 2260/202* (2013.01); *Y02T 50/672* (2013.01); *Y02T 50/676* (2013.01)

(58) Field of Classification Search
CPC ............. F02K 1/80; F02K 1/82; F02K 1/822; Y02T 50/672; F05D 2230/90; F05D 2250/31; F05D 2260/202
USPC .......................... 60/265, 266, 770, 39.5, 766; 239/265.19, 265.17, 127.1, 127.3
See application file for complete search history.

(56) References Cited

U.S. PATENT DOCUMENTS

| | | | |
|---|---|---|---|
| 3,874,711 A | 4/1975 | Scalzo et al. | |
| 5,346,365 A | 9/1994 | Matyscak | |
| 5,363,645 A * | 11/1994 | Pellet | F02K 9/64 165/907 |
| 5,596,870 A | 1/1997 | Dillard et al. | |
| 5,755,093 A | 5/1998 | Palusis et al. | |
| 5,782,294 A | 7/1998 | Froemming et al. | |
| 6,041,590 A * | 3/2000 | Hayton | F02K 1/822 60/766 |
| 6,109,663 A | 8/2000 | Hayton | |
| 6,199,371 B1 | 3/2001 | Brewer et al. | |
| 7,146,815 B2 | 12/2006 | Burd | |
| 7,430,867 B2 | 10/2008 | Agg | |
| 7,581,385 B2 | 9/2009 | Farah et al. | |
| 2008/0236138 A1 * | 10/2008 | Gustafsson | B64D 33/04 60/226.1 |
| 2009/0007567 A1 * | 1/2009 | Porte | F02C 7/141 60/785 |
| 2009/0178383 A1 | 7/2009 | Murphy et al. | |
| 2010/0021716 A1 * | 1/2010 | Strock | C04B 37/025 428/312.6 |
| 2010/0050649 A1 | 3/2010 | Allen | |
| 2010/0071382 A1 | 3/2010 | Liang | |

FOREIGN PATENT DOCUMENTS

KR  200369239 Y1  12/2004

OTHER PUBLICATIONS

Machine translation of KR 200369239, Dec. 4, 2004.*
International Preliminary Report on Patentability for International Application No. PCT/US2013/051203 mailed Feb. 5, 2015.
International Search Report and Written Opinion for International Application No. PCT/US2013/051203 completed on Oct. 24, 2013.

* cited by examiner

*Primary Examiner* — Christopher Verdier
(74) *Attorney, Agent, or Firm* — Carlson, Gaskey & Olds, PC

(57) ABSTRACT

An exhaust duct for a gas turbine engine has an inner wall and an outer wall connected by a plurality of spaced ribs. The duct extends axially. The ribs extend circumferentially across an entire cross-section of the inner and outer walls. The plurality of ribs is spaced axially along the exhaust duct. The inner wall has an inner surface facing an inner chamber. The inner surface receives a coating. The coating is deposited on a metal wire fiber strain isolation pad which is connected to the inner surface.

20 Claims, 4 Drawing Sheets

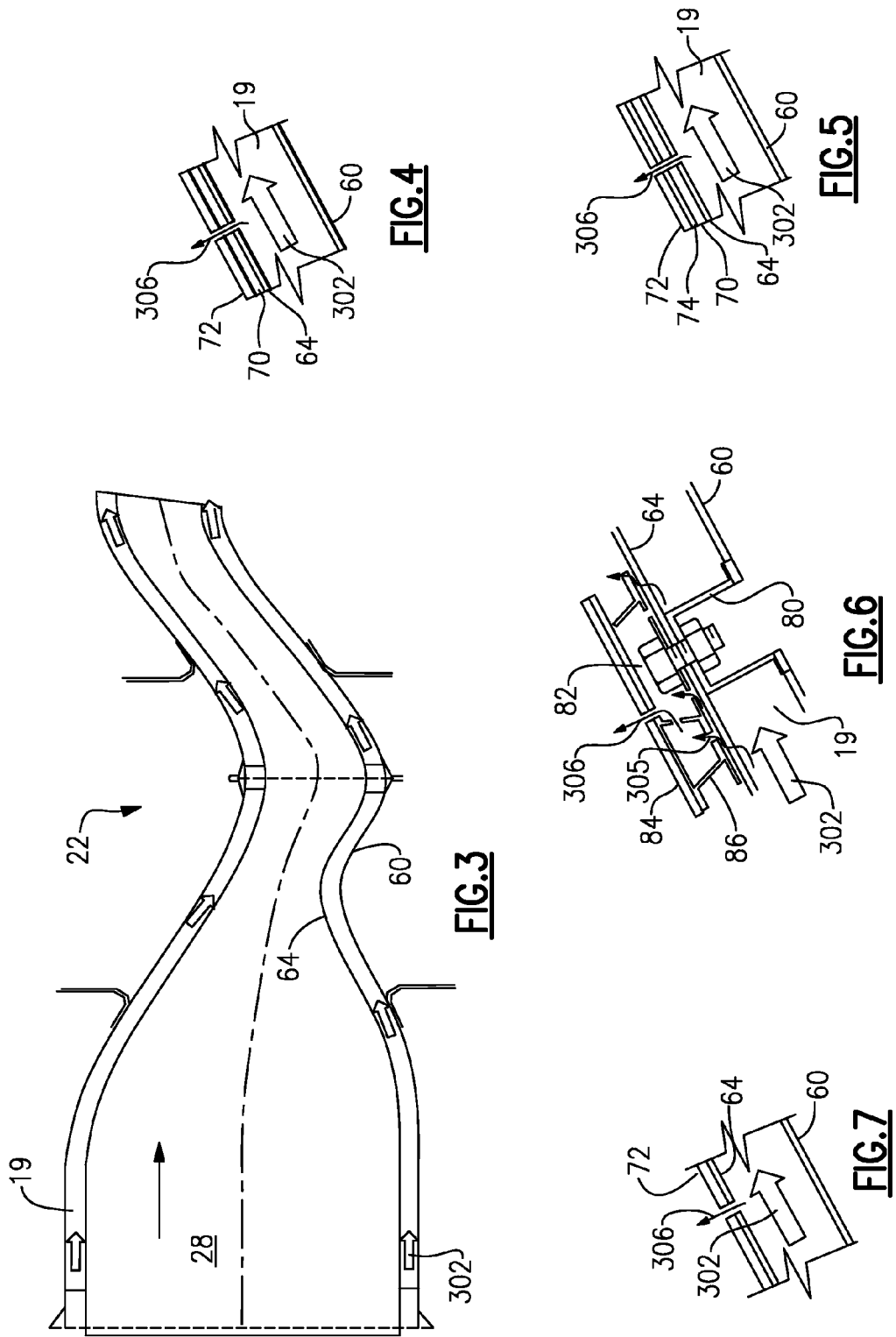

GAS TURBINE ENGINE EXHAUST DUCT

BACKGROUND OF THE INVENTION

This application relates to structural concepts for cooling a gas turbine engine exhaust duct.

Gas turbine engines are known, and typically include a compressor compressing air and delivering it into a combustor section. A fan delivers a portion of its airflow into the compressor, and also another portion into a bypass duct where it is utilized to provide thrust for the engine.

The air in the combustion section is mixed with fuel and ignited. Products of this combustion pass downstream over turbine rotors. Downstream of the turbine rotors, there may be an augmentor in some gas turbine engines. The products of combustion and the bypass air all leave the gas turbine engine through an exhaust duct. The exhaust duct may become quite hot, and thus cooling schemes are known.

One known type of exhaust duct mechanically connects a heat resistant liner facing a hot combustion gas flow to an outer exhaust wall. A space between the liner and the wall is provided with cooling airflow from the fan bypass air.

The exhaust duct experiences a number of stresses and strains along its length, and the mechanical connection of the liner in the prior art has raised some challenges, both with regard to the function and as to the complex construction.

SUMMARY OF THE INVENTION

In a featured embodiment, an exhaust duct for a gas turbine engine has an inner wall and an outer wall connected by a plurality of spaced ribs. The duct extends axially, and the ribs extend circumferentially across an entire cross-section of the inner and outer walls. The plurality of ribs are spaced axially along the exhaust duct. The inner wall has an inner surface facing an inner chamber, and receives a coating deposited on a metal wire fiber strain isolation pad which is connected to the inner surface.

In another embodiment according to the previous embodiment, the pad is directly bonded to the inner surface.

In another embodiment according to any of the previous embodiments, an intermediate bonding layer is positioned between the coating layer and pad.

In another embodiment according to any of the previous embodiments, a coating is attached to a separate liner connected to the inner wall at at least one location where the pad is not used.

In another embodiment according to any of the previous embodiments, the liner is attached by mechanical connections to the inner wall.

In another embodiment according to any of the previous embodiments, a coating is applied directly to the outer surface of the inner wall at at least one location where the pad is not used.

In another embodiment according to any of the previous embodiments, the duct is formed of four distinct sheets of metal formed together to form the inner wall, outer wall and ribs.

In another embodiment according to any of the previous embodiments, the duct has cross-sections that are non-cylindrical.

In another embodiment according to any of the previous embodiments, the duct has cross-sections that are cylindrical.

In another embodiment according to any of the previous embodiments, film cooling holes are formed through the inner wall. The coating provides film cooling to an outer surface of the coating.

In another featured embodiment, a gas turbine engine has a fan, a compressor section, a combustion section, and a turbine section. An exhaust duct has an inner wall and an outer wall connected by a plurality of spaced ribs. The duct extends axially and the ribs extend circumferentially across an entire cross-section of the inner and outer walls. The plurality of ribs are spaced axially along the exhaust duct. The inner wall has an inner surface facing an inner chamber. The inner surface receives a coating deposited on a metal wire fiber strain isolation pad connected to the inner surface.

In another embodiment according to the previous embodiment, the pad is directly bonded to the inner surface.

In another embodiment according to any of the previous embodiments, an intermediate bonding layer is positioned between the coating layer and pad.

In another embodiment according to any of the previous embodiments, a coating is attached to a separate liner mechanically connected to the inner wall at at least one location where the pad is not used.

In another embodiment according to any of the previous embodiments, the liner is attached by mechanical connections to the inner wall.

In another embodiment according to any of the previous embodiments, a coating is applied directly to the outer surface of the inner wall at at least one location where the pad is not used.

In another embodiment according to any of the previous embodiments, the duct is formed of four distinct sheets of metal formed together to form the inner wall, outer wall and ribs.

In another embodiment according to any of the previous embodiments, the duct has cross-sections that are non-cylindrical.

In another embodiment according to any of the previous embodiments, the duct has cross-sections that are cylindrical.

In another embodiment according to any of the previous embodiments, film cooling holes are formed through the inner wall. Coating provides film cooling to an outer surface of the coating.

These and other features of this application will be best understood from the following specification and drawings, the following of which is a brief description.

BRIEF DESCRIPTION OF THE DRAWINGS

FIG. 3 shows a duct.
FIG. 4 shows one structural concept which may be utilized in combination with the FIG. 3 duct.
FIG. 5 shows another structural concept.
FIG. 6 shows yet another structural concept.
FIG. 7 shows yet another structural concept.

DETAILED DESCRIPTION

Figure 1:
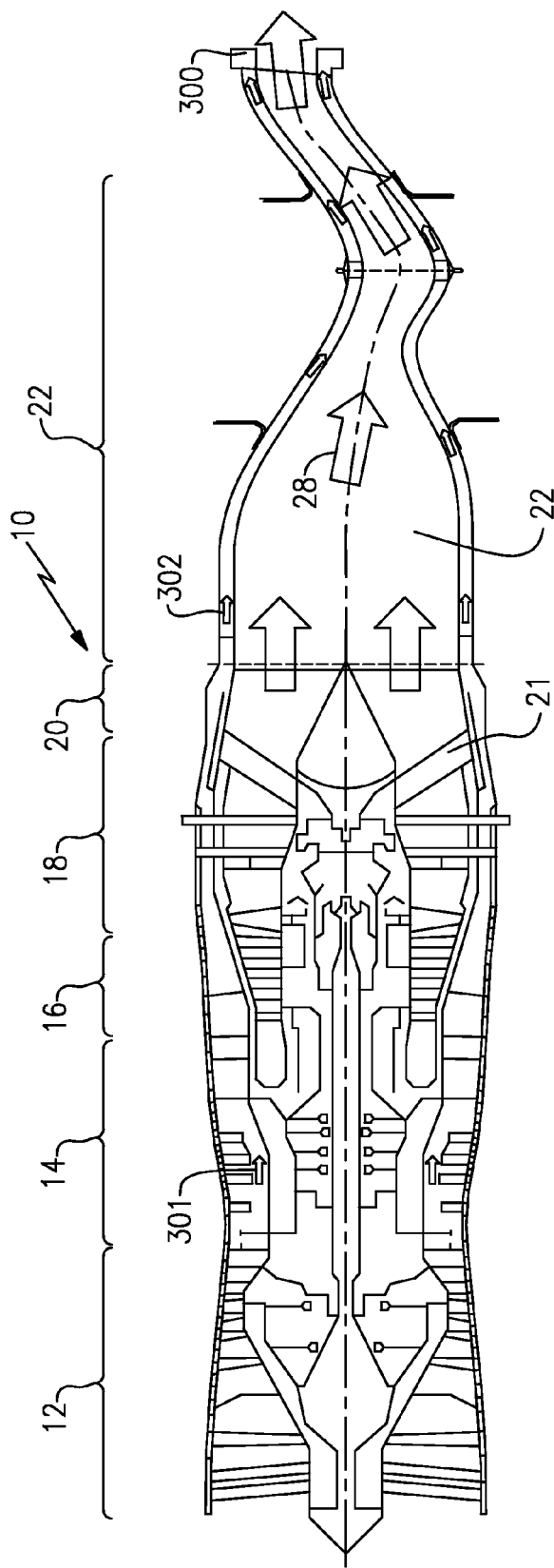
FIG. 1 schematically shows a gas turbine engine.

Referring to FIG. 1, a gas turbine engine 10 includes a fan section 12, a compressor section 14, a combustor section 16, and a turbine section 18. Air entering into the fan section 12 is initially compressed and a portion fed to the compressor section 14. Bypass air flow 301 provides the majority of the propulsion force from the engine. In the compressor section 14, the incoming air from the fan section 12 is further compressed and communicated to the combustor section 16. In the combustor section 16, the compressed air is mixed with gas and ignited to generate a hot exhaust stream 28. The hot exhaust stream 28 is expanded across the turbine section 18 to drive the fan section 12 and the compressor section 14. In this example, the gas turbine engine 10 includes an augmenter section 20 where additional fuel can be mixed with the exhaust gasses 28 and ignited to generate additional thrust. The exhaust gasses 28 flow from the turbine section 18 and the augmenter section 20 through an exhaust duct 22. Some bypass air 302 passes within the duct 22 as cooling air.

Of course, this application extends to engines without an augmentor section. Also, a fixed or variable nozzle 300, shown schematically, may be placed at the exit of the exhaust duct 22.

Figure 2A:
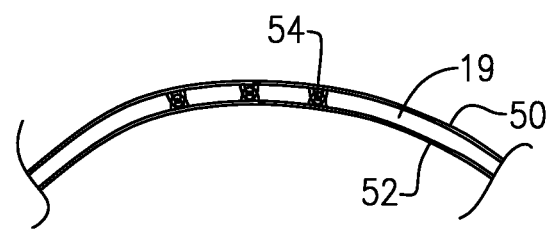
FIG. 2A shows a prior art duct construction.

FIG. 2A shows a wall construction used in known ducts. An outer wall 50 may be formed of titanium, and is attached to a heat resistant inner liner 52 which faces a hot gas flowpath. Other appropriate high temperature materials, such as nickel, cobalt or ceramic matrix composites may be used. Note, these are examples, and not an exhaustive list. Cooling air 302 passes through the space 19 between the walls 50 and liner 52 to cool the duct. The mechanical connection 54 of the liner 52 to the wall 50 is complex assembly, and creates a connection that raises potential challenges. The liner 52 may be formed of a single united structure, or two or more circumferentially and/or axially spaced segments.

Figure 2B:
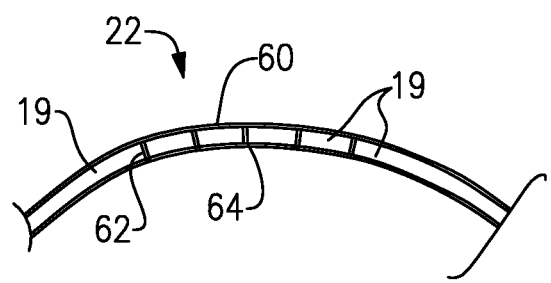
FIG. 2B shows a duct as utilized in embodiments of this invention.

FIG. 2B shows a duct 22 according to embodiments of this application. An inner wall 64 is connected to an outer wall 60 by crossing ribs 62 creating a united structure. Thus, the mechanical connections are eliminated. The method for forming the FIG. 2B structure will be disclosed below. Duct 22 may be a complete one-piece component, or may be formed of circumferentially spaced segments.

FIG. 3 shows the duct 22 having the coolant flowpath 302 in the space 19 defined between the walls 60 and 64. As known, the hot exhaust 28 passes through an interior chamber. Thus, some heat protection may be appropriate at locations along the inner wall 64.

FIG. 4 shows a first heat protection embodiment. A porous bonded strain isolation pad 70 is bonded directly to the outer surface of inner wall 64. An appropriate heat resistant coating 72 may then be placed on the bonded strain isolation pad. The bonded strain isolation pad may be formed of a sintered metal alloy wire formed into a pad. Examples of appropriate sintered metals may be nickel or cobalt-based alloys. A pad available under the trade name Brunsbond™, and from Brunswick Corporation may be used.

The pad is directly bonded to the outer surface of wall 64, such as via brazing techniques or other appropriate means.

The isolation pad is utilized in particular at locations along the duct 22 which will provide particularly challenging. The strain isolation pad 70 allows expansion of the wall 64 relative to the coating 72, and will provide a surface to allow adjustment between the two.

As shown, a hole 306 may be formed through the wall 64, pad 70, and coating layer 72. This allows some of the cooling air flow 302 to pass outwardly and provide film cooling along the outer surface of the coating 72. Thus, the cooling air flow 302 provides convective cooling to the outer wall 64, pad 70, and coating layer 72, but in addition film cooling holes provide additional cooling. Notably, it may not be necessary to form the holes 306 through the pad 70, as the pad 70 is porous, and will allow air flow across its radial dimension.

FIG. 5 shows another embodiment which is similar to FIG. 4. However, a bonded metallic layer 74 is interposed between the pad 70 and the coating layer 72. Under some conditions, the bonded metallic layer 74 may provide a better bond substrate for the coating than the strain isolation pad may provide.

FIG. 6 shows that prior art mechanical connections may be utilized in the inventive duct 22. As shown, a plug 80 is positioned between the wall 60 and 64 and a bolt 82 secures legs 86. The legs 86 provide a substrate for receiving the coating layer 84. This type of technique may be utilized at appropriate locations, in combination with the FIG. 4 or FIG. 5 techniques being utilized at other locations. In this embodiment, a first set of holes 305 may extend through the wall 64, and the legs 86. Additional holes 306 may be formed through the coating layer 84. Again, this will provide film cooling.

Finally, FIG. 7 shows a technique wherein the coating 72 is applied directly to the outer surface of the inner wall 64. This may be utilized at locations which are not expected to be subject to undue amounts of heat and/or strain. Again, cooling holes 306 may be used.

Figure 8A:
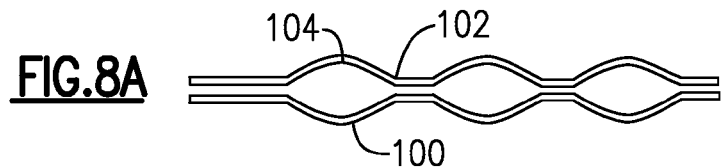
FIG. 8A shows a first step in forming the duct construction.
Figure 8B:
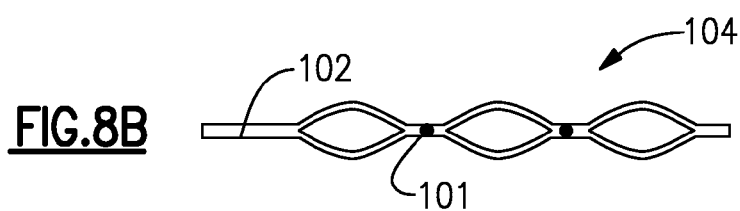
FIG. 8B shows a subsequent step.

The basic duct may be formed by a method known as super plastic forming/diffusion bonding, and as illustrated schematically in FIGS. 8A-8F. As shown in FIG. 8A, two titanium sheets 100 and 102 may be preformed and have enlarged portions 104. The two sheets may be selectively bonded together as shown in FIG. 8B at 101, such as by welding, diffusion bonding, etc.

Figure 8C:
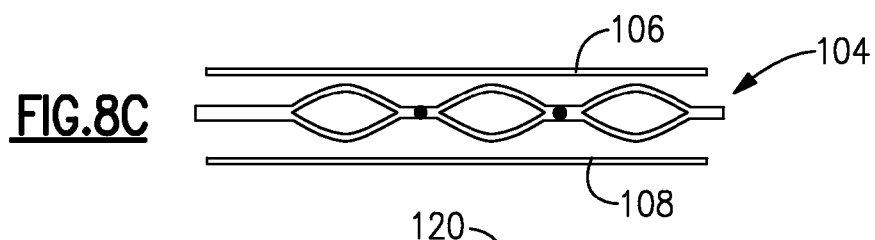
FIG. 8C shows a subsequent step.
Figure 8D:
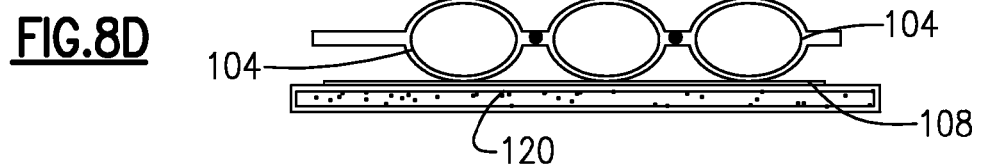
FIG. 8D shows another subsequent step.

As shown in FIG. 8C, the intermediate bonded sheets 104 are now placed between two additional sheets 106 and 108. As show in FIG. 8D, dies 120 may be utilized on opposed sides of the sheets 106 and 108, and a vacuum and pressurization may be utilized to inflate the features 104.

Figure 8E:
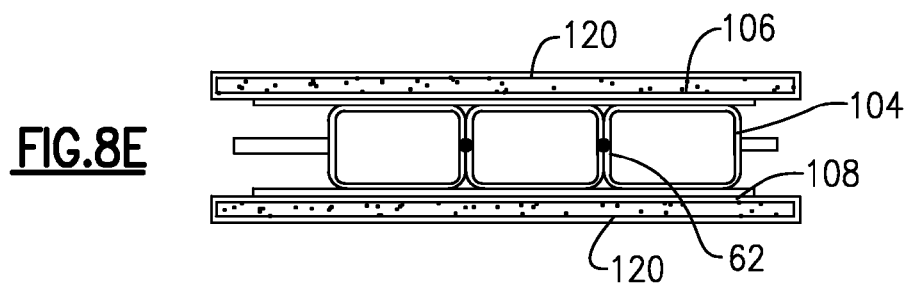
FIG. 8E shows yet another subsequent step.

As show in FIG. 8E, superplastic deformation may be utilized to make the features 104 enlarge until they contact each other, thus forming the ribs 62.

Figure 8F:
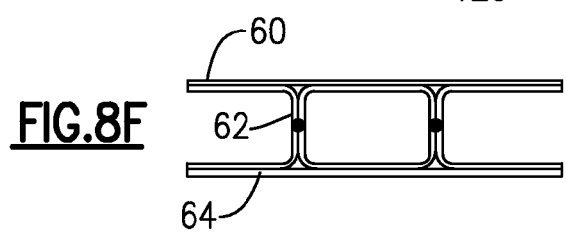
FIG. 8F shows a final duct construction.
Figure 9:
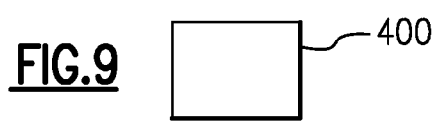
FIG. 9 shows an optional feature.

FIG. 8F shows the final shape, with the walls 64 and 60 spaced and connected by the rib 62. As can be appreciated, the ribs will be generally extending circumferentially across the entire circumference of the duct 22. A cross-section of the duct may be cylindrical at some portions, and may be other geometric shapes, such as generally rectangular, as shown schematically at 400 in FIG. 9, at other portions. For purposes of this application, however, the duct will be said to extend axially, as there will be a center at most locations along the duct, and thus the ribs 62 are said to extend circumferentially about the central axis, and separate ones of the ribs 62 are spaced axially. Again, the term "circumferentially" typically applies to cylindrical items, but is utilized in this application with the understanding that the duct cross-section will often not be cylindrical. As used herein, the term simply means it extends across the entire cross-sectional boundary of any section taken into the plane of FIG. 3, as an example.

The porous strain isolation pad 70 allows post-processing of cooling features, and efficiently utilizes the air in the space or passages 19. The height and distance between the walls 60 and 64 in duct 22 may be adjusted and designed over the contour of duct 22 to optimize the convective cooling, and associated pressure losses in the passages 19. Note, some passages 19 may be terminated at a downstream end at selected circumferential locations to allow for more closely tailored cooling distribution over the duct 22.

As mentioned above, the duct may be formed of multiple circumferential segments. Also, methods other than super plastic forming/diffusion bonding may be used to arrive at the FIG. 8F structure. Other techniques may include brazing, welding and additive manufacturing to name a few.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An exhaust duct for a gas turbine engine comprising:
an inner wall and an outer wall connected by a plurality of spaced ribs, said duct extending axially, and the ribs extending circumferentially across an entire cross-section of the inner and outer walls, and said plurality of ribs being spaced axially along the exhaust duct; and
said inner wall having an inner surface facing an inner chamber, and said inner surface receiving a coating, with said coating deposited on a metal wire fiber strain isolation pad which is connected to said inner surface.

2. The duct as set forth in claim 1, wherein said pad is directly bonded to said inner surface.

3. The duct as set forth in claim 1, wherein an intermediate bonding layer is positioned between said coating layer and said pad.

4. The duct as set forth in claim 2, wherein a coating is attached to a separate liner which is connected to said inner wall at at least one location where said pad is not used.

5. The duct as set forth in claim 4, wherein said liner is attached by mechanical connections to said inner wall.

6. The duct as set forth in claim 1, wherein a coating is applied directly to an outer surface of said inner wall at at least one location where said pad is not used.

7. The duct as set forth in claim 1, wherein said duct is formed of four distinct sheets of metal which are formed together to form said inner wall, said outer wall and said ribs.

8. The duct as set forth in claim 1, wherein said duct has cross-sections that are non-cylindrical.

9. The duct as set forth in claim 1, wherein said duct has cross-sections that are cylindrical.

10. The duct as set forth in claim 1, wherein film cooling holes are formed through said inner wall and said coating to provide film cooling to an outer surface of said coating.

11. A gas turbine engine comprising:
a fan, a compressor section, a combustion section, and a turbine section;
an exhaust duct having an inner wall and an outer wall connected by a plurality of spaced ribs, said duct extending axially, and the ribs extending circumferentially across an entire cross-section of the inner and outer walls, and said plurality of ribs being spaced axially along the exhaust duct; and
said inner wall having an inner surface facing an inner chamber, and said inner surface receiving a coating, with said coating deposited on a metal wire fiber strain isolation pad which is connected to said inner surface.

12. The gas turbine engine as set forth in claim 11, wherein said pad is directly bonded to said inner surface.

13. The gas turbine engine as set forth in claim 12, wherein an intermediate bonding layer is positioned between said coating and said pad.

14. The gas turbine engine as set forth in claim 11, wherein a coating is attached to a separate liner which is mechanically connected to said inner wall at at least one location where said pad is not used.

15. The gas turbine engine as set forth in claim 14, wherein said liner is attached by mechanical connections to said inner wall.

16. The gas turbine engine as set forth in claim 11, wherein a coating is applied directly to an outer surface of said inner wall at at least one location where said pad is not used.

17. The gas turbine engine as set forth in claim 11, wherein said duct is formed of four distinct sheets of metal which are formed together to form said inner wall, said outer wall and said ribs.

18. The gas turbine engine as set forth in claim 11, wherein said duct has cross-sections that are non-cylindrical.

19. The gas turbine engine as set forth in claim 11, wherein said duct has cross-sections that are cylindrical.

20. The gas turbine engine as set forth in claim 11, wherein film cooling holes are formed through said inner wall and said coating to provide film cooling to an outer surface of said coating.

* * * * *